US009189138B2

(12) United States Patent
Aoki et al.

(10) Patent No.: US 9,189,138 B2
(45) Date of Patent: Nov. 17, 2015

(54) DISPLAY CONTROL DEVICE, STORING MEDIUM, DISPLAY SYSTEM, AND DISPLAY METHOD

(71) Applicant: NINTENDO CO., LTD., Kyoto (JP)

(72) Inventors: Ryoma Aoki, Kyoto (JP); Munetaka Tsuda, Kyoto (JP); Yasuto Kakimoto, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 360 days.

(21) Appl. No.: 13/845,882

(22) Filed: Mar. 18, 2013

(65) Prior Publication Data

US 2014/0137031 A1 May 15, 2014

(30) Foreign Application Priority Data

Nov. 15, 2012 (JP) ................................ 2012-251437

(51) Int. Cl.
*G06F 3/0484* (2013.01)
*G06F 17/30* (2006.01)

(52) U.S. Cl.
CPC ...... *G06F 3/04845* (2013.01); *G06F 17/30905* (2013.01)

(58) Field of Classification Search
CPC .................................................. G06F 3/0484
See application file for complete search history.

(56) References Cited

U.S. PATENT DOCUMENTS

2006/0038796 A1* 2/2006 Hinckley et al. ............. 345/173
2008/0155463 A1* 6/2008 Lian et al. .................... 715/786
2010/0110034 A1* 5/2010 Teng ............................ 345/173

FOREIGN PATENT DOCUMENTS

JP 10-301750 11/1998

OTHER PUBLICATIONS

"Tilt to Scroll: Evaluating a Motion Based Vibrotactile Mobile Interface" by Ian Oakley (hereinafter Oakley) published Mar. 2005.*
Oakley et al "Tilt and Feel: Scrolling with Vibrotactile Display", http://citeseerx.ist.psu.edu/viewdoc/summary?doi=10.1.1.108.3976, Jan. 1, 2004, 8 pages.
Sad et al: "Evaluation and Modeling of User Performance for Pointing and Scrolling Tasks on Handheld Devices Using Tilt Sensor", 2009 Second International Conferences on Advances in Computer-Human Interactions, ACHI '09. Feb. 1, 2009, 6 pages.
"Method and System for Scrolling a User Interface by Tilting a Mobile Device", IP.com Journal, Sep. 19, 2011, 4 pages.
Oakley et al: "Tilt to Scroll: Evaluating a Motion Based Vibrotactile Mobile Interface", Haptic Interfaces for Virtual Environment and Teleoperator Systems, Mar. 2005, 10 pages.
Boring et al: "Scroll, Tilt or Move it: Using Mobile Phones to Continuously Control Pointers on Large Public Displays" Association for Computing Machinery, vol. 411, Nov. 23, 2009, 8 pages.
Jun. 5, 2013, European Search Report for EP 13159352.7, 6 pages.

* cited by examiner

*Primary Examiner* — Peiyong Weng
(74) *Attorney, Agent, or Firm* — Nixon & Vanderhye P.C.

(57) ABSTRACT

An example display control device including: a first acquisition unit that acquires operation information indicative of an orientation of an device held by a user; a second acquisition unit that acquires size information in dictate of a size of a content displayed on a display; a determination unit that determines, based on the acquired size information, a scrolling amount by which the content displayed on the display is scrolled in a predetermined direction in accordance with the acquired operation information; and a display controller that controls display of the content performed by the display unit to scroll the content by the determined scrolling amount in accordance with the acquired operation information.

12 Claims, 5 Drawing Sheets

DISPLAY CONTROL DEVICE, STORING MEDIUM, DISPLAY SYSTEM, AND DISPLAY METHOD

CROSS-REFERENCE TO RELATED APPLICATIONS

This application is based on and claims priority under 35 U.S.C. 119 from Japanese Patent Application No. 2012-251437, which was filed on Nov. 15, 2012.

FIELD

The application relates to technology of scrolling displayed contents.

BACKGROUND AND SUMMARY

It is common for electronic devices to adopt an operating method that supports operations other than button operations and touch operations on a touch screen. Such an operating method works by, for example, displacing the electronic devices.

The application provides a display control device including: a first acquisition unit that acquires operation information indicative of an orientation of an device held by a user; a second acquisition unit that acquires size information in dictate of a size of a content displayed on a display; a determination unit that determines, based on the acquired size information, a scrolling amount by which the content displayed on the display is scrolled in a predetermined direction in accordance with the acquired operation information; and a display controller that controls display of the content performed by the display unit to scroll the content by the determined scrolling amount in accordance with the acquired operation information.

BRIEF DESCRIPTION OF THE DRAWINGS

Exemplary embodiments will now be described in detail based on the following figures, wherein:

FIG. 8 shows an example non-limiting display of content and the like.

DETAILED DESCRIPTION OF NON-LIMITING EXAMPLE EMBODIMENT

1. Summary of Exemplified Embodiments

The main feature of the present embodiment is that the scrolling amount by which content is scrolled in accordance with a user operation varies depending on the size of the content. Note that a size mentioned herein typically refers to the length of content in the scrolling direction. More specifically, in the present embodiment, the speed at which displayed content is scrolled in the scrolling direction feels faster when the displayed content has a greater length in the scrolling direction. As a result, contents of various lengths can be scrolled from the top to the bottom with a similar operational feel.

The aforementioned feature can be realized by making the scrolling amount per unit amount of operation vary depending on the length of content. For example, in the case where a user performs an operation to rotate a certain object, the present embodiment is realized by determining the scrolling amount per unit angle of rotation of the certain object based on the length of content.

Figure 1:
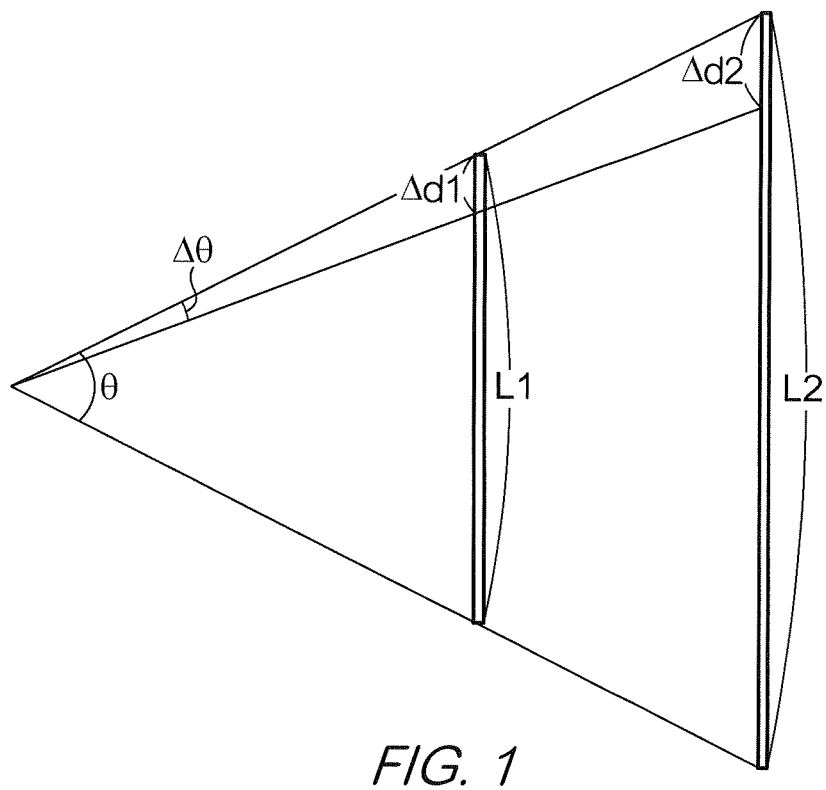
FIG. 1 is a schematic diagram for explaining an example non-limiting feature of the present embodiment.

FIG. 1 is a schematic diagram for explaining a relationship between the scrolling amount per unit angle of user operation and a length of content. In FIG. 1, L1 and L2 each represent a length of content in a predetermined direction, and satisfy the relationship L1<L2. Furthermore, θ represents a range of rotation defined when the user rotates a certain object (e.g. a controller). Note that this range does not necessarily represent a range in which the object can be moved. That is to say, the user can rotate the object in a range larger than θ.

Provided that a unit angle is Δθ, the scrolling amount per unit angle Δθ is Δd1 when the length of the content is L1, and Δd2 when the length of the content is L2. Here, the relationship Δd1<Δd2 is satisfied. As such, the scrolling amount Δd1, Δd2 per unit angle Δθ varies depending on the length of the content. Therefore, user operations to rotate the object by the same angle do not always result in a fixed scrolling amount. The scrolling amount is determined in accordance with the length of the content.

In this way, whether the length of displayed content is L1 or L2, the user can scroll the content from the top to the bottom by performing a rotating operation by an angle of θ. Hence, even when the user views content that is long in a certain direction, the user can scroll this content from the top to the bottom using an operation similar to an operation used when viewing shorter content without having to repeat the same rotating operation many times.

Figure 2:
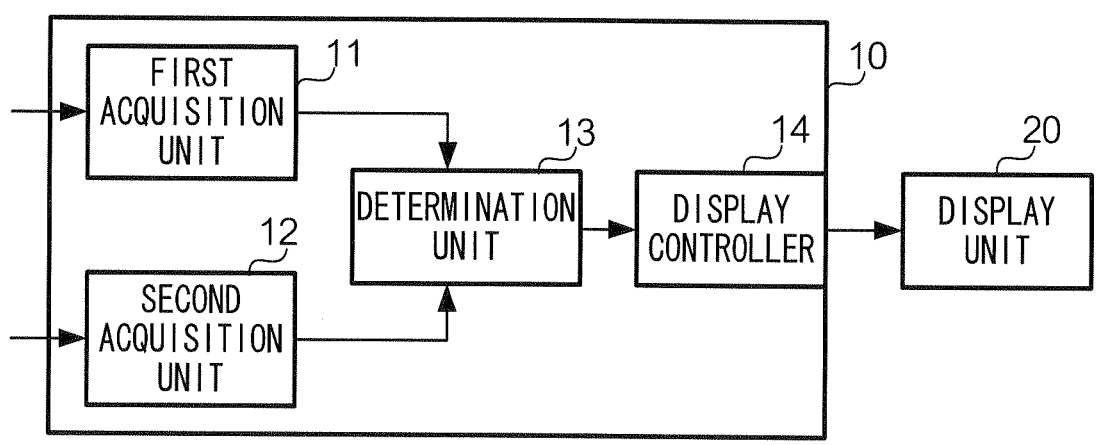
FIG. 2 is a block diagram showing an example non-limiting functional configuration of the present embodiment.

FIG. 2 is a block diagram showing a functional configuration for realizing the present embodiment. Display control device 10 according to the present embodiment controls display of content performed by display unit 20, and includes at least first acquisition unit 11, second acquisition unit 12, determination unit 13, and display controller 14. Note that display unit 20, which displays content, may or may not be integrated with display control device 10.

First acquisition unit 11 acquires operation information. Note that the operation information shows a user operation, or more specifically, a movement of a certain part of the user's body and a movement of an object displaced thereby. The operation information includes at least information for scrolling content. The operation information may also include information showing other operations.

Second acquisition unit 12 acquires size information showing the size of the content. It suffices for the size information to identify the size of the content in a predetermined direction, that is to say, a direction in which the content is scrolled. The size information may not necessarily show the size in the predetermined direction per se.

Determination unit 13 determines the scrolling amount by which the content is scrolled. Determination unit 13 determines the scrolling amount in accordance with the operation information acquired by first acquisition unit 11 and the size information acquired by second acquisition unit 12. For example, determination unit 13 determines the scrolling amount per unit amount of operation based on the size information, and determines the actual scrolling amount based on the operation information. Note that the direction in which the content is scrolled is neither limited to a particular direction, nor limited only to one direction.

Display controller 14 controls display of the content performed by display unit 20. Display controller 14 also scrolls the content by the scrolling amount determined by determination unit 13 in accordance with a user operation. More specifically, display controller 14 provides display unit 20 with data that is necessary for display unit 20 to display the content.

When display control device 10 acquires the operation information for scrolling the content being displayed by display unit 20, display control device 10 determines the scrolling amount in accordance with the acquired operation information and controls display unit 20 to scroll the content by the determined scrolling amount. Once the content has been displayed, display control device 10 can acquire the size information of the content, and hence can identify the scrolling amount per unit amount before the user starts a specific operation for scrolling.

2. Details of the Exemplary Embodiments

Figure 3:
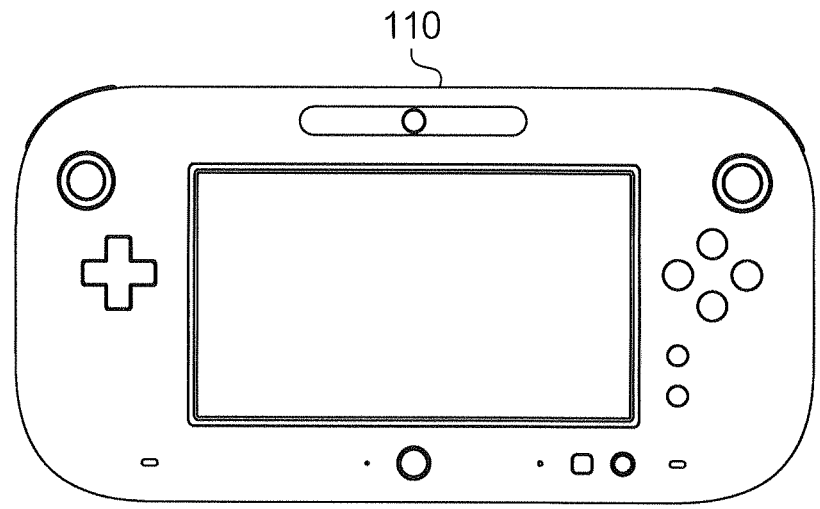
FIG. 3 shows an example non-limiting external configuration of an information terminal.

FIG. 3 shows an external configuration of information terminal 110 which is one embodiment of the present embodiment. Information terminal 110 is a display device of a size that enables user operations while the user is holding information terminal 110. Information terminal 110 can display content. It is assumed in the present embodiment that the content is a web page and is scrolled in a vertical (up-and-down) direction.

Figure 4:
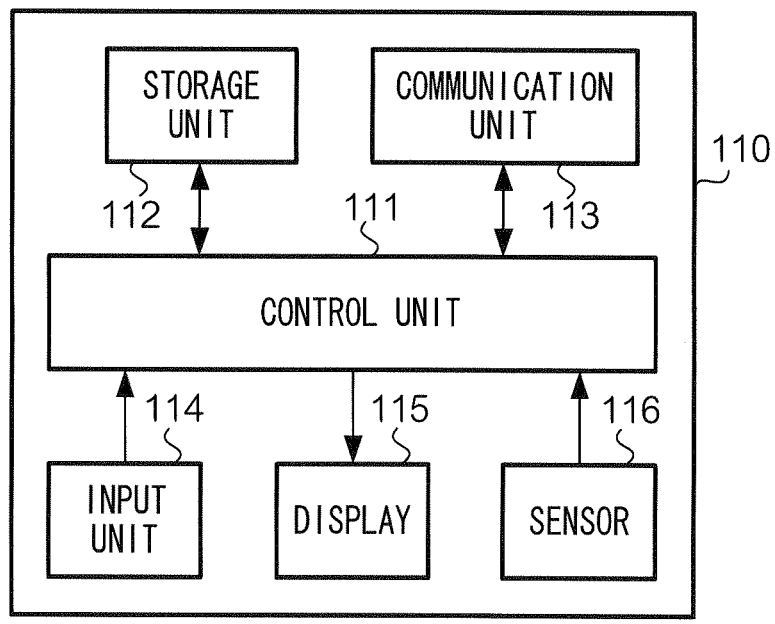
FIG. 4 is a block diagram showing an example non-limiting hardware configuration of an information terminal.

FIG. 4 is a block diagram showing a hardware configuration of information terminal 110. Information terminal 110 includes control unit 111, storage unit 112, communication unit 113, input unit 114, display 115, and sensor 116.

Control unit 111 controls operations of the units included in information terminal 110. Control unit 111 includes an arithmetic processing device, such as a central processing unit (CPU), and a memory, and performs control by executing predetermined programs. Control unit 111 may include a CPU and a graphics processing unit (GPU) that share the execution of processing related to display of the content.

Storage unit 112 stores data. Storage unit 112 includes a recording medium such as a hard disk drive and a flash memory, and stores data used by control unit 111. For example, storage unit 112 stores a program (application program) for realizing functions of a so-called web browser and various types of data necessary for display control.

Communication unit 113 transmits data to and receives data from an external network such as the Internet. For example, communication unit 113 receives data for displaying a web page (hereinafter referred to as "page data"), such as data of the Hyper Text Markup Language (HTML).

Input unit 114 accepts user operations. Input unit 114 includes buttons (keys) mounted on predetermined positions of information terminal 110, and provides control unit 111 with operation information corresponding to a button that has been pressed down. Alternatively, input unit 114 may include a touch screen that overlies a display area of display 115, or may include a so-called analog stick or lever.

Display 115 displays images such as web pages. Display 115 includes a display area (display panel) constituted by liquid crystal elements or organic electroluminescence (EL) elements and a driving circuit therefor. Display 115 displays images corresponding to display data provided by control unit 111. Note that the display data is obtained by performing rendering based on the page data.

Sensor 116 detects the operational state of information terminal 110. Note that the operational state represents, for example, whether information terminal 110 is operating, whether information terminal 110 has ceased operating, and to what extent information terminal 110 has been tilted from a reference state. Sensor 116 includes a gyroscope, an acceleration sensor, a gravity sensor, and the like, and provides control unit 111 with values output therefrom. Control unit 111 uses these output values as the operation information. Basically, in the present embodiment, the angular velocity output from the gyroscope is used in detection of the status, and the values output from the acceleration sensor and the gravity sensor are used in correction of the angular velocity.

This concludes the description of the configuration of information terminal 110. With the above configuration, information terminal 110 accepts a user operation and displays a web page in accordance with the accepted operation. The user may select a web page from bookmarks stored information terminal 110 in or input a uniform resource locator (URL) using input unit 114.

In the present embodiment, the user can scroll a web page using various operating methods. A first operating method uses input unit 114. For example, the user can scroll a web page by pressing down a predetermined button, moving his/her finger on the surface of the touch screen in a predetermined direction, or tilting the analog stick in a predetermined direction. A second operating method changes the orientation of information terminal 110. The user can scroll a web page by changing the tilt of information terminal 110 by standing up or laying down information terminal 110.

Also, in the present embodiment, the second operating method is used when a web page is displayed in a reduced size. That is to say, information terminal 110 accepts an operation based on the first operating method when displaying a web page in a certain size, and accepts an operation based on the second operating method when displaying the web page in a size smaller than the certain size. In this way, the user can use the first operating method when scrolling at a relatively low speed, and use the second operating method when scrolling at a speed faster than the speed for the first operating method. That is to say, the user can use different operating methods for different purposes of operations. For example, the user can use the first operating method when scrolling a web page little by little, and the second operating method when scrolling a web page from the top to the bottom at once.

Figure 5:
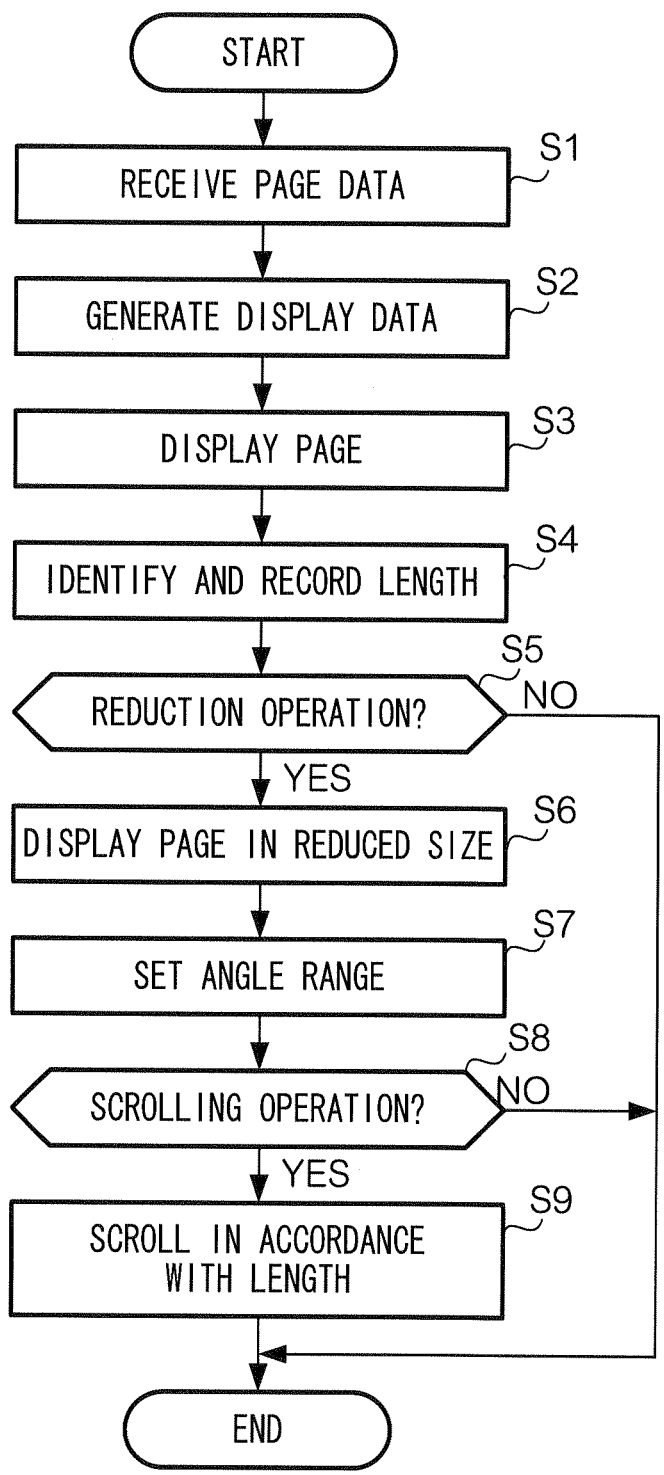
FIG. 5 is a flowchart of an example non-limiting processing executed by an information terminal.

FIG. 5 is a flowchart of processing executed by information terminal 110 when displaying a web page. Note that this flowchart shows partial processes for realizing the second operating method. Other processes are omitted. For example, the first operating method is not shown in the figures as it can be realized by known technology.

In order to display a web page, control unit 111 of information terminal 110 first receives page data via communication unit 113 (step S1). Next, control unit 111 performs rendering based on the page data and generates display data (step S2). Then, control unit 111 displays the web page by providing display 115 with the display data (step S3). It is assumed here that display 115 does not display the entirety of the web page, but displays only a part of the web page in such a manner that the web page can be scrolled at least in the up-and-down direction.

As a result of generating the display data, the entire content and the length of the web page are revealed. Accordingly, control unit 111 identifies the length of the web page based on the display data, and records the identified length in a memory of control unit 111 (or in storage unit 112) as size information (step S4). Control unit 111 can thus acquire the size information.

Thereafter, control unit 111 determines whether or not a predetermined operation has been performed (step S5). Specifically, this predetermined operation is an operation for displaying the web page in a reduced size, and is therefore referred to as a "reduction operation" hereinafter. The reduction operation is, for example, an operation for pressing down a certain button of input unit 114. It is more preferable that this operation be performed while the user firmly holds information terminal 110 so as to perform the subsequent operation (tilting operation) more reliably. The reduction operation is one example of a first operation according to the present embodiment. Note that the orientation of information terminal 110 at the time of the reduction operation is hereinafter referred to as a "reference position".

Upon acquiring operation information showing the reduction operation, control unit 111 causes display 115 and display unit 122 to display the web page in a reduced size (step S6). By displaying the web page in a reduced size, the amount of the web page displayed in a display area is increased. Therefore, it can be said that by displaying the web page in a reduced size, the scrolling amount necessary for displaying the entirety of the web page (that is to say, from the top to the bottom of the web page) is reduced.

Furthermore, in the event of acquisition of the operation information showing the reduction operation, control unit 111 identifies the orientation of information terminal 110 at that time (that is to say, the reference position), and sets an angle range for a user operation (step S7). Note that the angle range denotes a range that is set to associate an operation for scrolling content (hereinafter referred to as a "scrolling operation") with a scrolling amount. The scrolling operation is one example of a second operation according to the present embodiment. Note that control unit 111 identifies the reference position only when switching from the state where the operation information showing the reduction operation has not been acquired to the state where the operation information showing the reduction operation has been acquired.

Control unit 111 then determines whether or not the scrolling operation has been performed (step S8). The scrolling operation is an operation for changing the orientation of information terminal 110 from the reference position, that is to say, an operation for tilting information terminal 110 by rotating information terminal 110 in the up-and-down direction. The scrolling operation is identified by values output from sensor 116. Upon acquiring the operation information showing the scrolling operation, control unit 111 scrolls the web page by the scrolling amount corresponding to the acquired operation information and the size information recorded in step S3 (step S9).

Figure 6:
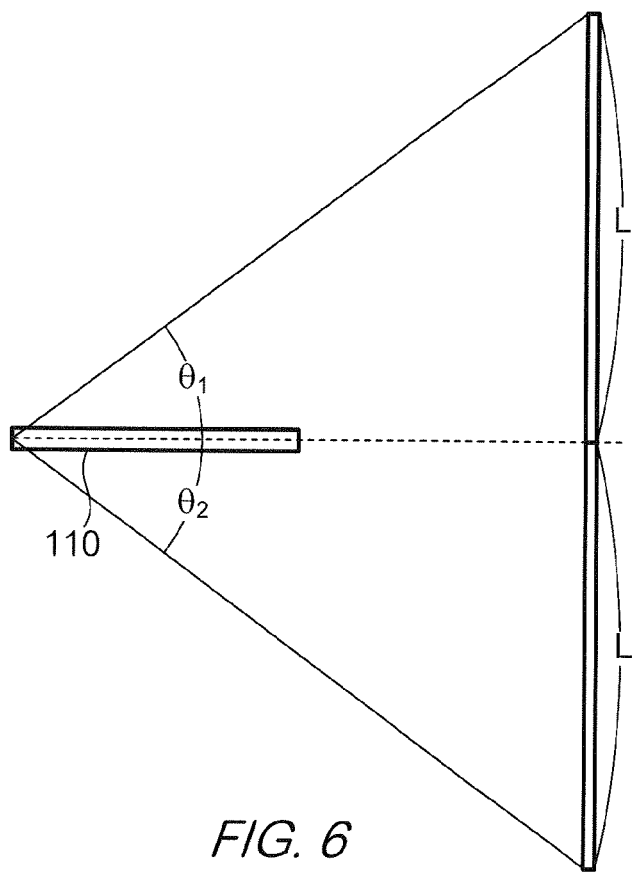
FIG. 6 is a schematic diagram showing an example non-limiting angle range.

FIG. 6 is a schematic diagram showing an angle range set by control unit 111. Control unit 111 sets an angle range by adding $\theta_1$ in the upward direction and $\theta_2$ in the downward direction to the reference, that is to say, the orientation of information terminal 110 at the time of acquisition of the operation information showing the reduction operation. Note that $\theta_1$ and $\theta_2$ may be different from each other. It is assumed here that $\theta_1=\theta_2=45°$.

Provided that the length of displayed content in the vertical direction is L, a unit angle is $\Delta\theta$, and a scrolling amount per unit angle is $\Delta d$, $\Delta d$ satisfies the following expression 1. That is to say, the longer the length of the content (L), the larger the scrolling amount per unit angle ($\Delta d$). In the present example, $\Delta d$ is proportional to L.

$$\Delta d=(\Delta\theta/\theta_1)\times L=(\Delta\theta/\theta_2)\times L \quad (1)$$

Note that expression 1 applies to the case where the lengths of the display areas of display 115 and display unit 122 in the vertical direction are sufficiently small in relation to the length of the content in the vertical direction and therefore need not be taken into consideration. On the other hand, when the lengths of the display areas in the vertical direction ($L_0$) are taken into consideration, the following expression 2 may be used in place of expression 1.

$$\Delta d=(\Delta\theta/\theta_1)\times(L-L_0)=(\Delta\theta/\theta_2)\times(L-L_0) \quad (2)$$

Control unit 111 calculates the actual scrolling amount based on the scrolling amount per unit angle obtained in the above manner. Provided that the actual scrolling amount is D and the angle of rotation by the user's scrolling operation is $\theta$, D satisfies the following expression 3.

$$D=\Delta d/\Delta\theta\times\theta \quad (3)$$

When $\Delta d$ of expression 3 is substituted by expression 1, D satisfies the following expression 4. That is to say, control unit 111 can calculate the scrolling amount (D) by multiplying the length of the content in the vertical direction (L) and the angle of rotation ($\theta$) by the user's scrolling operation, and by dividing the result of multiplication by the angle range ($\theta_1$, $\theta_2$).

$$D=L\times\theta/\theta_1=L\times\theta/\theta_2 \quad (4)$$

Note that in the case where a scrolling operation is repeated multiple times, e.g. in the case where a scrolling operation, halting of rotation of information terminal 110, and another scrolling operation are performed in this order, control unit 111 can determine the scrolling amount in a similar manner. In this case, when performing the scrolling operation from the second time onwards, control unit 111 can calculate the scrolling amount based on a change in the orientation from the position of information terminal 110 at the time of completion of the previous scrolling operation (instead of a change in the orientation from the reference position).

By associating $\Delta d$ with a scrolling operation in the above manner, when the user rotates information terminal 110 by $\theta_1$ in the upward direction from the reference position, the web page is scrolled so that display of the bottom of the web page is changed to display of the top of the web page, irrespective of the length of the web page in the vertical direction. Furthermore, when the user rotates information terminal 110 by $\theta_2$ in the downward direction from the reference position, the web page is scrolled so that display of the top of the web page is changed to display of the bottom of the web page. Hence, by setting $\Delta d$ in the above manner, rotation of information terminal 110 by $\theta_1$ or $\theta_2$ allows web pages of various lengths to be scrolled and displayed from the top to the bottom, regardless of the positions of the web pages that were displayed on a display area when information terminal 110 was at the reference position.

As has been described above, no matter how long a web page is, rotating information terminal 110 within a certain range allows information terminal 110 to scroll and display the web page in its entirety. Therefore, even when the user views a web page that is longer than an ordinary web page in the vertical direction, the user can scroll the web page with an operational feel similar to an operational feel of viewing the ordinary web page.

Meanwhile, when scrolling a web page using the second operating method according to the present embodiment, the longer a web page, the larger a scrolling amount per unit angle. Therefore, the second operating method is not necessarily suited for scrolling of a small amount. However, in the present embodiment, the user can choose between the first operating method and the second operating method, and therefore can scroll the web page using an appropriate operating method that is suited for the current situation.

3. Variations

The above embodiment is one aspect of embodiments of the present embodiment. The present embodiment is not limited to the above embodiment, and can also be embodied based on the aspects represented by the following variations. Note that the following variations may be applied in combination as necessary.

Variation 1

As has been described above, when the present embodiment is applied, the longer a web page, the larger a scrolling amount per unit angle. However, as there is no particular restriction on the length of web pages, some web pages may be extremely long. When such a web page is displayed and scrolled using the second operating method in the above embodiment, there is a possibility that the web page is scrolled at a speed at which the user can hardly see anything.

In view of this, a predetermined threshold may be set for the length of web pages in the present embodiment. In this case, when the length of a web page exceeds this threshold, the web page is not scrolled by a scrolling amount that exceeds this threshold for an operation within the aforementioned angle range (that is to say, a change in the orientation of information terminal 110 within the aforementioned angle range). In this way, the scrolling amount per unit angle can be restricted to a range determined by the threshold.

When information terminal 110 acquires operation information showing a change in the orientation that exceeds the aforementioned angle range (that is to say, when information terminal 110 is tilted from the reference position by an angle larger than $\theta_1$ or $\theta_2$), content may be scrolled at a predetermined speed.

Figure 7:
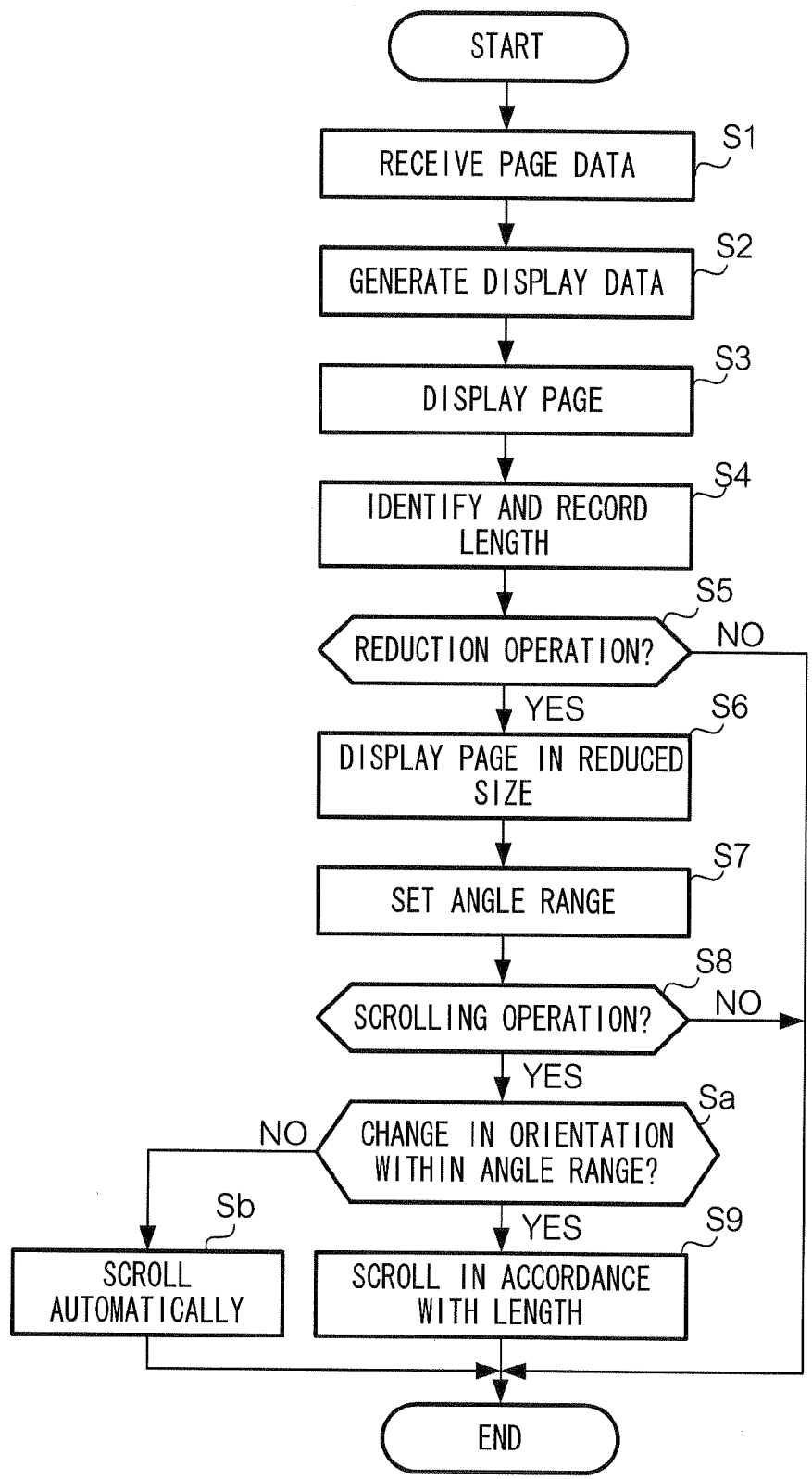
FIG. 7 is a flowchart of an example non-limiting processing executed by an information terminal.

FIG. 7 is a flowchart for the case where the present variation is applied. This flowchart is obtained by changing a part of the flowchart according to the above embodiment (FIG. 5). Therefore, a description of steps that are the same as in the flowchart of FIG. 5 is omitted. The following only describes the steps unique to the present variation.

The operations of the present variation differ from the above embodiment in including the processes of steps Sa and Sb. In the flowchart of FIG. 7, the steps that are similar to the steps in the flowchart of FIG. 5 described in the above embodiment are given the same reference signs thereas.

In step Sa, control unit 111 determines whether or not the scrolling operation in step S8 represents a change in the orientation within the angle range set in step S7. That is to say, control unit 111 determines whether or not a change in the orientation of information terminal 110 from the reference position falls within $\theta_1$ or $\theta_2$. The subsequent process varies depending on the result of this determination.

When the scrolling operation represents a change in the orientation within the predetermined angle range, control unit 111 executes a process similar to the process described in the above embodiment (step S9). That is to say, when the change in the orientation caused by the scrolling operation does not exceed the predetermined range, control unit 111 scrolls the web page by a scrolling amount corresponding to the operation information showing the current scrolling operation and the size information recorded in step S3. On the other hand, when the scrolling operation represents a change in the orientation that exceeds the predetermined angle range, control unit 111 performs an operation that is different from the operation performed when the change in the orientation caused by the scrolling operation does not exceed the predetermined range. That is to say, when the change in the orientation caused by the scrolling operation exceeds the predetermined range, control unit 111 automatically scrolls the web page (step Sb). The process executed in step Sb is hereinafter referred to as "automatic scrolling".

Note that the automatic scrolling denotes a form of scrolling whereby the web page keeps scrolling even when the user maintains information terminal 110 at the same orientation. On the other hand, the scrolling performed in step S9 is determined in accordance with the orientation of information terminal 110 (that is to say, the tilt of information terminal 110 with respect to the reference position). Therefore, the scrolling is not performed in step S9 when information terminal 110 is maintained at the same orientation. That is to say, in the present variation, when the user tilts information terminal 110 by an angle larger than $\theta_1$ or $\theta_2$, the operation of continuous scrolling is performed thereafter even without a change in the orientation of information terminal 110. Note that the speed of the automatic scrolling may be fixed irrespective of the orientation (tilt) of information terminal 110, or may be faster for larger deviation from the angle range.

Aside from the above, information terminal 110 may move the position of the web page currently displayed to the top or the bottom when the orientation of information terminal 110 drastically changes. More specifically, when the orientation of information terminal 110 changes within a predetermined time period by an angle that exceeds the predetermined range, information terminal 110 moves the position of the web page currently displayed to the top or the bottom in accordance with the direction of the change in the orientation (the upward direction or the downward direction).

Variation 2

Information terminal 110 may display an image showing the reference position and the angle range together with a web page. Information terminal 110 may further display an image showing a relationship between the orientation thereof and the reference position or the angle range.

Figure 8:
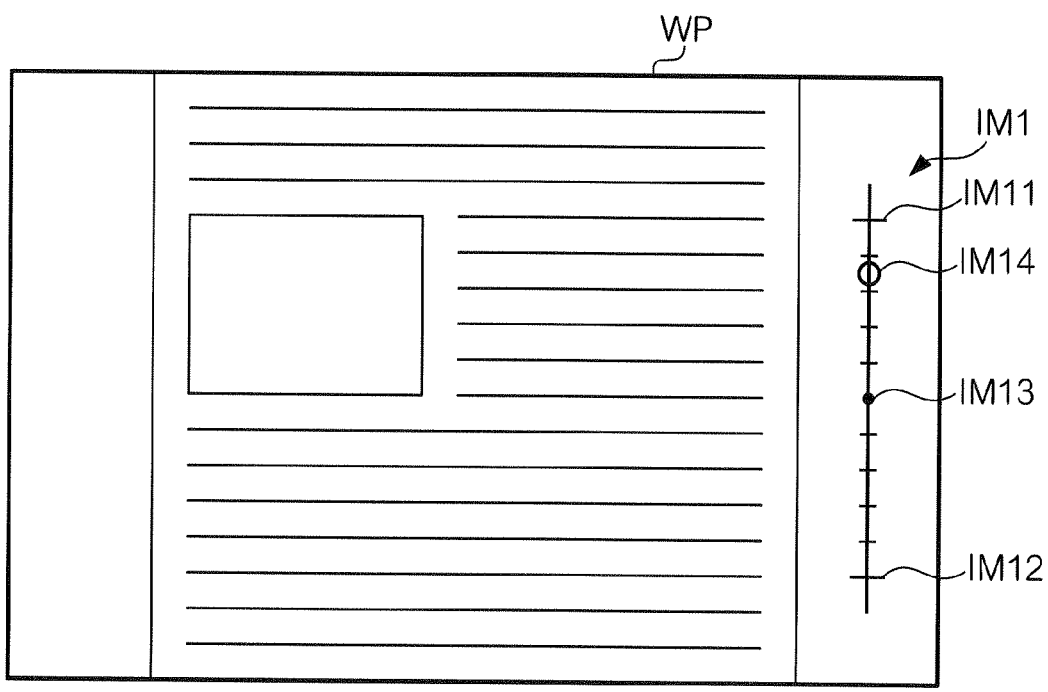

FIG. 8 shows an example of display according to the present variation. In FIG. 8, image IM1 shows a relationship among the orientation of information terminal 110, the reference position and the angle range. In the example of FIG. 8, when web page WP is displayed in a reduced size, image IM1 is displayed in an area where web page WP is not displayed (that is to say, in a margin area).

Image IM1 is composed of images IM11, IM12, IM13 and IM14. Images IM11 and IM12 each show the angle range, and image IM13 shows the reference position. Image IM14 shows the current orientation of information terminal 110. The position of image IM14 moves upward or downward when the orientation of information terminal 110 changes.

Display of image IM1 allows the user to learn an overview of the scrollable display. For example, by checking image IM1, the user can learn to what extent information terminal 110 needs to be tilted to return to the reference position. Furthermore, display of image IM1 in variation 1 allows the user to learn to what extent information terminal 110 needs to be tilted to start the automatic scrolling.

Variation 3

The second operating method may not be performed when a web page is displayed in a reduced size. More specifically, information terminal 110 may scroll the web page in accordance with a change in the orientation thereof without the web page being displayed in a reduced size.

Variation 4

In the present embodiment, content is not limited to a web page. In the present embodiment, content may be anything that is displayed in a certain size in a scrollable manner, e.g. so-called plain text and a table such as a spreadsheet. Furthermore, content is not limited to extend in a vertical direction, but may instead extend in a horizontal direction.

Moreover, in the present embodiment, the size information may be any data that can identify the length in a predetermined direction. For example, the lengths of some contents can be identified by a data capacity (the number of bytes), the number of characters, and the number of objects included in the content (e.g. the number of fixed images).

Variation 5

An operation according to the present embodiment is not limited to an operation to move an object such as information terminal 110. For example, the present embodiment may detect a movement of a part of the user's body (e.g. a hand) using an image sensor or a depth sensor, and scroll content based on the detected movement.

Variation 6

Different individuals perform different user operations. Especially, when it comes to an operation to change the orientation of information terminal 110, the extent to which information terminal 110 can be moved may vary with each person's physical characteristics. In view of this, information terminal 110 may be configured such that the aforementioned angle range can be set, for example, by the user operating input unit 114. Information terminal 110 may also be configured such that, when it is shared among a plurality of users, settings for each user are stored and the angle range can be changed in accordance with a current user.

Variation 7

The display control device according to the present embodiment is not limited to information terminal 110. For example, the display control device according to the present embodiment may be configured such that it does not include a display unit itself and controls a display device including a display unit via communication. The display control device according to the present embodiment may also be applied to various electronic devices such as a personal computer, a game console and a smartphone.

In the present embodiment, functions of display control device 10 (see FIG. 2) may be realized by a program. Display control device 10 may be realized by coordination among a plurality of programs instead of a single program. For example, display control device 10 may include a program for realizing first acquisition unit 11, second acquisition unit 12 and determination unit 13 separately from a program for realizing display controller 14. These programs need not be executed on the same device, and may be executed on separate devices. Note that these programs (information processing programs) may be provided by being recorded in a recording medium such as an optical disc and a semiconductor memory, or by being downloaded to an information processing device via a network such as the Internet.

The foregoing description of the embodiments is provided for the purposes of illustration and description. Obviously, a large number of possible modifications and variations will be apparent to practitioners skilled in the art. The embodiments were chosen and described in order to best explain the principles of the technology and its practical applications, thereby enabling others skilled in the art to understand the technology in various embodiments, and with the various modifications as suited to a particular use that may be contemplated.

What is claimed is:

1. A display control device comprising:
a processing system that includes at least one hardware processor coupled to electronic memory, the processing system configured to:
acquire operation information indicative of an orientation of a device held by a user;
determine a change amount of the acquired operation information that is indicative of how much the orientation of the device has changed;
acquire size information indicative of a size of a content displayed on a display;
determine whether the determined change amount of operation information exceeds a predetermined operation range;
determine, based on the acquired size information, a scrolling amount by which the content displayed on the display is scrolled in a predetermined direction in accordance with the acquired operation information; and
cause the content that is displayed on the display to scroll by the determined scrolling amount in accordance with the acquired operation information,
wherein, as a result of the determined change amount not exceeding the predetermined operation range, the scrolling amount is determined in accordance with the acquired size information, and
wherein, as a result of the determined change amount exceeding the predetermined operation range, the scrolling amount is determined such that the content is scrolled at a determined speed.

2. The display control device according to claim 1, wherein the scrolling amount is determined such that the larger the size indicated by the size information, the larger the scrolling amount per unit amount of operation indicated by the operation information.

3. The display control device according to claim 1, wherein the size information indicates a length of the content in the predetermined direction.

4. The display control device according to claim 1, wherein the speed is determined based on the change in the amount of operation indicated by the operation information.

5. The display control device according to claim 1, wherein the processing system is further configured to:
scroll the content by the determined scrolling amount when a change in an amount of operation indicated by the operation information does not exceed a predetermined range; and
automatically scroll the content when the change in the amount of operation indicated by the operation information exceeds the predetermined range.

6. The display control device according to claim 1, wherein:
the operation information indicates a tilt of the device held by the user; and
a scrolling amount per unit angle of the tilt is determined based on the size information.

7. The display control device according to claim 6, wherein a scrolling amount by which the content is scrolled is determined based on the scrolling amount per unit angle and on a change in the tilt indicated by the operation information.

8. The display control device according to claim 1, wherein:
the operation information includes first operation information and second operation information, the first operation information indicative of a first operation performed before the content is scrolled, and the second operation information indicative of a second operation that is different from the first operation and is for scrolling the content; and the second operation performed after the first operation information is acquired is associated with the scrolling amount.

9. The display control device according to claim 1, wherein the scrolling amount is determined for a case where the content is displayed in a reduced size based on the acquired size information.

10. A non-transitory computer readable storage medium storing a computer program for use with a computer system that includes at least one hardware processor and electronic memory coupled to the at least one hardware processor, the computer program comprising instructions that cause computer system to:

acquire operation information indicative of an orientation of a device held by a user;

determine a change amount of operation information that is indicative of how much the orientation of the device has changed;

acquire size information indicative of a size of a content displayed on a display;

determine whether the determined change amount of operation information is outside of a predetermined operation range;

determine a scrolling amount by which the content displayed on the display is scrolled in a predetermined direction in accordance with the acquired operation information; and responsive to determination of the scrolling amount, scroll the content displayed on the display in accordance with determination of the scrolling amount, wherein, as a result of the determined change amount not being outside of the predetermined operation range, the scrolling amount is determined based on the acquired size information, wherein, as a result of the determined change amount being outside of the predetermined operation range, the scrolling amount is determined such that content is scrolled at a predetermined speed.

11. A computer system comprising:

a display that includes a display screen configured to display graphical content to a user;

a processing system that includes at least one hardware processor coupled to electronic memory, the processing system configured to:

acquire operation information indicative of an orientation of a device held by a user;

determine a change amount of operation information that is indicative of how much the orientation of the device has changed;

acquire size information based on a size of the content displayed on the display screen of the display;

determine whether the determined change amount of operation information exceeds a predetermined operation range;

determine a scrolling amount by which the content displayed on the display is scrolled in a predetermined direction in accordance with the acquired operation information; and responsive to determination of the scrolling amount, cause the content displayed on the display to scroll on the display screen in accordance with determination of the scrolling amount, wherein, as a result of the determined change amount not exceeding the predetermined operation range, the scrolling amount is determined based on the acquired size information, wherein, as a result of the determined change amount exceeding the predetermined operation range, the scrolling amount is determined such that content is scrolled at a predetermined limit speed.

12. A display method for use with a computing system that includes at least one hardware processor coupled to electronic memory, the computing system coupled to a display device that includes a display screen, the display method comprising:

concurrently displaying, on the display screen of the display device, a portion of a content;

acquiring operation information indicative of an orientation of a device held by a user that is viewing the concurrently displayed portion of the content on the display screen;

automatically determining, by using the at least one hardware processor, a change amount of operation information that is indicative of how much the orientation of the device has changed;

automatically determining, by using the at least one hardware processor, whether the change amount of operation information exceeds a predetermined operation range; and responsive to acquisition of the operation information that is indicative of the orientation, scrolling the content by a scrolling amount, wherein, as a result of the determined change amount not exceeding of the predetermined operation range, the scrolling amount is based on the acquired size information, wherein, as a result of the determined change amount exceeding the predetermined operation range, the scrolling amount is set at a predetermined speed.

* * * * *